(12) United States Patent
Sato et al.

(10) Patent No.: US 10,514,517 B2
(45) Date of Patent: Dec. 24, 2019

(54) OPTICAL FIBER CABLE

(71) Applicant: SUMITOMO ELECTRIC INDUSTRIES, LTD., Osaka-shi, Osaka (JP)

(72) Inventors: Fumiaki Sato, Yokohama (JP); Keisuke Okada, Yokohama (JP); Yoshiaki Nagao, Yokohama (JP); Kenta Tsuchiya, Yokohama (JP); Nobuyuki Suzuki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/748,810

(22) PCT Filed: Jul. 22, 2016

(86) PCT No.: PCT/JP2016/071628
§ 371 (c)(1),
(2) Date: Jan. 30, 2018

(87) PCT Pub. No.: WO2017/022531
PCT Pub. Date: Feb. 9, 2017

(65) Prior Publication Data
US 2019/0011656 A1 Jan. 10, 2019

(30) Foreign Application Priority Data

Jul. 31, 2015 (JP) .................................. 2015-151941
Aug. 6, 2015 (JP) .................................. 2015-156064
Oct. 14, 2015 (JP) .................................. 2015-202539

(51) Int. Cl.
*G02B 6/44* (2006.01)
*H01B 7/08* (2006.01)

(52) U.S. Cl.
CPC ............. *G02B 6/4409* (2013.01); *G02B 6/44* (2013.01); *G02B 6/441* (2013.01); *G02B 6/448* (2013.01);

(Continued)

(58) Field of Classification Search
None
See application file for complete search history.

(56) References Cited

U.S. PATENT DOCUMENTS

| 4,820,014 A * | 4/1989 | Nishimura | G02B 6/4408 385/103 |
| 5,638,478 A * | 6/1997 | Iwakura | G02B 6/4408 385/104 |
| 6,212,321 B1 * | 4/2001 | Ishikawa | G02B 6/4489 385/111 |

FOREIGN PATENT DOCUMENTS

| EP | 0 996 016 A2 | 4/2000 |
| JP | S53-20578 A | 2/1978 |

(Continued)

OTHER PUBLICATIONS

Isotani, Kenji, Machine Translation of JP 2014-211511A, 2014. (Year: 2014).*

(Continued)

*Primary Examiner* — Michelle R Connelly
(74) *Attorney, Agent, or Firm* — Drinker Biddle & Reath LLP

(57) ABSTRACT

Provided is an optical fiber cable whereby macrobend loss can be suppressed even when ribbons are mounted at high density in grooves. An optical fiber cable provided with optical units in which ribbons each having a plurality of optical fiber cores arranged in parallel are collected, a slot rod having a plurality of grooves for accommodating optical units, a tension member on which tension is applied, and a cable jacket for covering the outside of the slot rod. Each of the optical units is accommodated in the corresponding groove in a stranded state, and the occupancy of the optical units calculated from the cross-sectional area of the optical units with respect to the cross-sectional area of the groove is 25% to 65%.

10 Claims, 7 Drawing Sheets

(52) U.S. Cl.
CPC ......... *G02B 6/4408* (2013.01); *G02B 6/4432* (2013.01); *H01B 7/08* (2013.01); *G02B 6/4403* (2013.01)

(56) References Cited

FOREIGN PATENT DOCUMENTS

| | | | |
|---|---|---|---|
| JP | H08-334662 A | | 12/1996 |
| JP | 09197204 A | * | 7/1997 |
| JP | 11202170 A | * | 7/1999 |
| JP | 2007-25400 A | | 2/2007 |
| JP | 2007025400 A | * | 2/2007 |
| JP | 2007-279226 A | | 10/2007 |
| JP | 2011-169937 A | | 9/2011 |
| JP | 2011-169938 A | | 9/2011 |
| JP | 2011169937 A | * | 9/2011 |
| JP | 2012208313 A | * | 10/2012 |
| JP | A-2013-195334 | | 9/2013 |
| JP | 2014-74910 A | | 4/2014 |
| JP | 2014-211511 A | | 11/2014 |
| JP | 2014211511 A | * | 11/2014 |
| JP | 2015-52692 A | | 3/2015 |
| JP | 2015052692 A | * | 3/2015 |
| JP | 2016-020990 A | | 2/2016 |
| JP | 2016-75814 A | | 5/2016 |
| JP | 2016-133611 A | | 7/2016 |
| WO | WO-2014-119616 A1 | | 8/2014 |

OTHER PUBLICATIONS

Ona et al., Machine Translation of JP 2012-208313 A, 2012. (Year: 2012).*

Sekiguchi et al., Machine Translation of JP 2007-025400 A, 2007. (Year: 2007).*

* cited by examiner

OPTICAL FIBER CABLE

TECHNICAL FIELD

The present invention relates to an optical fiber cable, and more specifically, to an optical fiber cable having a slot rod with a plurality of grooves configured to accommodate therein a plurality of optical fiber ribbons.

RELATED ART

An optical fiber cable having a slot rod (also referred to as 'spacer') with a plurality of grooves has been used. In the respective grooves, optical fiber ribbons (hereinafter, also referred to as 'ribbons') having a plurality of optical fibers arranged in parallel can be accommodated, for example. While a tension member is embedded in a center of the slot rod, an outer side of the slot rod is wrapped by a wrapping tape, which is then covered by a cable sheath (also referred to as 'sheath'), for example.

When the accommodated ribbons are applied with a pressure from sidewalls of the grooves, microbend loss or macrobend loss is caused, so that transmission characteristics of the optical fibers are deteriorated. In order to avoid this, for example, Patent Document 1 discloses a technology of freely rotating the ribbons in the grooves.

CITATION LIST

Patent Documents

Patent Document 1: JP-A-2014-211511

SUMMARY OF THE INVENTION

Problems to be Solved

When the optical fiber cable is bent into a circular arc shape, the tension member becomes a center of bending, tensile stress is generated at an outer side of the tension member, and compressive stress is generated at an inner side of the tension member, so that the compressive strain is applied to the ribbon positioned at the inner side. When the ribbon can be moved in a longitudinal direction of the cable so as to cancel the compressive strain, the transmission loss is slight.

However, when the ribbons are mounted at high density in the grooves, the ribbons are difficult to move in the longitudinal direction of the cable and portions thereof that cannot withstand the compressive strain protrude outside the grooves, so that the macrobend loss may be caused at the portions. For this reason, it is needed to suppress the macrobend loss even when the ribbons are mounted at high density in the grooves of the slot rod.

The present invention has been made in view of the above situations, and an object thereof is to provide an optical fiber cable capable of suppressing macrobend loss even when ribbons are mounted at high density in grooves.

Means for Solving Problems

An optical fiber cable in accordance with an aspect of the present invention comprises:

optical units in each of which ribbons each having a plurality of optical fibers arranged in parallel are collected;
a slot rod having a plurality of grooves each configured to accommodate therein the optical units;
a tension member to which tension is to be applied; and
a cable sheath configured to cover an outer side of the slot rod, wherein in each of the grooves, the optical units are accommodated in a state where each of the optical units is stranded, and an occupancy of the optical units calculated from a cross-sectional area of the optical units relative to a cross-sectional area of the groove is 25% to 65%

Effects of the Invention

According to the above configuration, it is possible to suppress the macrobend loss even when the ribbons are mounted at high density in the grooves.

DETAILED DESCRIPTION OF EMBODIMENTS

Description of Embodiments of Present Invention

Figure 1:
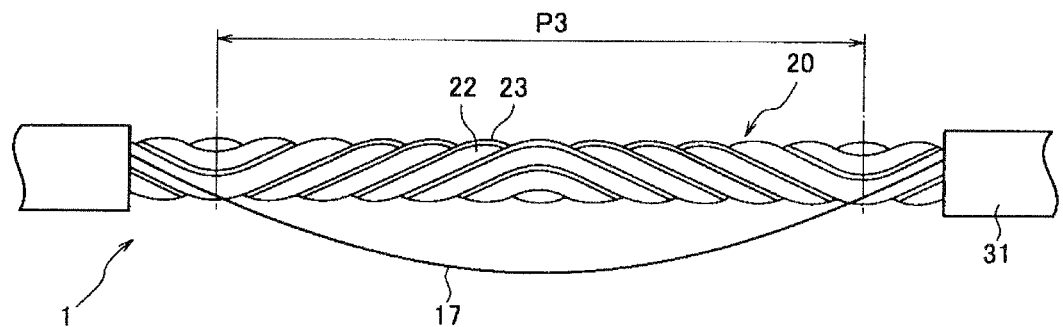
FIG. 1 depicts an example of an optical fiber cable in accordance with a first embodiment of the present invention.

First, embodiments of the present invention are described.
An optical fiber cable in accordance with an aspect of the present invention, (1) an optical fiber cable comprising:
optical units in each of which ribbons each having a plurality of optical fibers arranged in parallel are collected;
a slot rod having a plurality of grooves each configured to accommodate therein the optical units;
a tension member to which tension is to be applied; and
a cable sheath configured to cover an outer side of the slot rod,
wherein in each of the grooves, the optical units are accommodated in a state where each of the optical units is stranded, and an occupancy of the optical units calculated from a cross-sectional area of the optical units relative to a cross-sectional area of the groove is 25% to 65%.

The optical units stranded in advance are accommodated in the grooves of the slot rod, so that it is possible to suppress macrobend loss even when the ribbons are mounted at high density in the grooves. Specifically, in a state where the optical units are stranded, when the occupancy is 65% or less, even though the cable is bent into a circular arc shape, the compressive strain is dispersed without being concentrated on some optical fibers, so that it is possible to suppress the macrobend loss and to improve the bendability of the cable. Also, when the occupancy of the stranded optical units is 25% or higher, it is possible to increase the density of the ribbons. As a result, even when the ribbons are mounted at high density in the grooves, it is possible to suppress the transmission loss of the optical fibers.

(2) When the two adjacent optical fibers of the ribbon are configured as one sub-unit, at least one of a recess portion and a step portion positioned between the adjacent sub-units is intermittently provided with a slit portion in a longitudinal direction.

Since the slit portions are provided intermittently along a longitudinal direction of the intermittent ribbons, it is possible to reduce a shock force that is to be applied to the optical fibers upon separation of a single fiber.

(3) The ribbon is intermittently provided with coupling portions, at which the adjacent optical fibers are coupled therebetween, and non-coupling portions, at which the adjacent optical fibers are not coupled therebetween, in a longitudinal direction between some or all of the optical fibers in a state where the plurality of optical fibers is arranged in parallel.

The non-coupling portions are provided intermittently in the longitudinal direction, so that it is possible to easily separate a single fiber.

(4) The ribbon is continuously provided with the coupling portions in the longitudinal direction between the adjacent optical fibers of both ends thereof.

The coupling portions formed continuously in the longitudinal direction between the adjacent optical fibers of both ends are provided, so that it is possible to improve the operability when setting the optical fibers to an optical fiber holder upon welding operation, without deteriorating the productivity and deformability easiness of the intermittent ribbon.

(5) A coupling length of the coupling portion positioned at a more inner side in an aligning direction of the ribbon is longer than a coupling length of the coupling portion positioned at an outermore side.

The length of the coupling portion positioned at the inner side, to which the large deformation stress is to be applied, is made longer than the coupling portion positioned at the outer side, so that it is possible to prevent breakage.

(6) The ribbon is an optical fiber ribbon having 2N (N: an integer of 3 or greater) optical fibers, a sub-unit is integrated every M (M: an even number smaller than N) optical fibers, coupling portions and non-coupling portions are intermittently provided in a longitudinal direction between the adjacent sub-ribbons, the adjacent sub-ribbons are coupled and a ribbon part at which the 2M optical fibers are coupled is one part or less.

Since the ribbon part coupling the adjacent sub-ribbons with the coupling portions is not provided at two or more places in the width direction of the optical fiber ribbon, the optical fiber ribbon can be easily bent in the width direction of the ribbon. As a result, it is possible to provide the optical fiber ribbon capable of preventing the deterioration of transmission characteristics and being easily handled, as compared to the related art. Also, when the optical fiber ribbon is configured by the sub-ribbons, a greater width than a single fiber is obtained. Therefore, when setting the ribbon to a welding holder, for example, the sub-ribbon has difficulty riding on the adjacent coupling portion, being inverted, and separating and protruding from a holder groove, so that it is possible to rapidly perform the welding operation.

(7) The ribbons to be accommodated in the same groove of the slot rod have at least two types of intermittent pitches.

Since the coupling portions and the non-coupling portions are made not to repeat by constant lengths, even when the ribbon is mounted to the cable with a constant stranding pitch, the same structure portions of the intermittent ribbon are not mounted at the places of the cable at which the stranding pitch is same, and the stress to be applied to the intermittent ribbon is also alleviated in the longitudinal direction, so that it is possible to prevent the large transmission loss.

(8) Integrated ribbon parts in which the plurality of optical fibers is all coupled by the coupling portions and slitted ribbon parts in which the non-coupling portions adjacent to each other in an aligning direction of the ribbon are alternately arranged in a longitudinal direction of the ribbon are periodically provided in the longitudinal direction of the ribbon, and the slitted ribbon parts are configured to form single fiber ribbon parts, which are to be obtained by separating all the plurality of optical fibers with the non-coupling portions.

Upon the welding operation, the integrated ribbon part is used, and upon the separation operation, the single fiber ribbon part is used. Therefore, it is possible to achieve both the welding operability and the single fiber separability.

(9) A minimum thickness part of a rib configured to partition the respective grooves of the slot rod is positioned at an outermore side than a half circumferential portion of a diameter of a slot circumscribed circle of which a center is a tension member, and a rib thickness increases from the minimum thickness part toward a rib tip end.

The rib of the slot rod is expanded at the tip end, so that a groove width at the periphery of the outer peripheral surface of the rib is narrowed. However, since it is possible to secure a height of the groove, it is possible to resultantly increase the cross-sectional area of the groove. Therefore, it is possible to increase the cross-sectional area of the groove without changing the outer periphery position of the slot rod.

(10) A stranding pitch of the optical unit is shorter than a stranding pitch of the groove.

As compared to a configuration where the stranding pitch of the optical unit is equivalent to or longer than the stranding pitch of the groove, the compressive strain is dispersed, so that it is possible to easily improve the bendability of the cable.

(11) The groove is configured by a combination of an SZ locus of a short period and an SZ locus of a period longer than the short period.

The cable is wound to a body part of a winding drum (not shown) with relatively high tension so as to prevent wrapping breakage and the like, and the tension to be applied to the upper layer cable becomes a side pressure of the lower layer cable. Therefore, when the grooves are configured by a complex type of SZ on SZ, a period thereof becomes random (i.e., is not constant), so that it is possible to randomize the side pressure to be applied to the ribbon upon the winding to the drum, which also contributes to improvements on the side pressure characteristic.

(12) When an intermittent pitch of the ribbon in the longitudinal direction is denoted as P1, a stranding pitch of the optical unit is denoted as P2, and a stranding pitch of the slot rod is denoted as P3, a relation of 2.5≤P2/P1≤7.5 is satisfied, and a composite stranding pitch Pmix expressed by 1/Pmix=1/P2+1/P3 is 398 or smaller.

Under these conditions, the transmission loss is favorable, and the intermittent ribbon is not separated upon primary stranding.

Details of Embodiments of Present Invention

Hereinafter, favorable embodiments of the optical fiber cable of the present invention will be described with reference to the accompanying drawings.

Figure 2A:
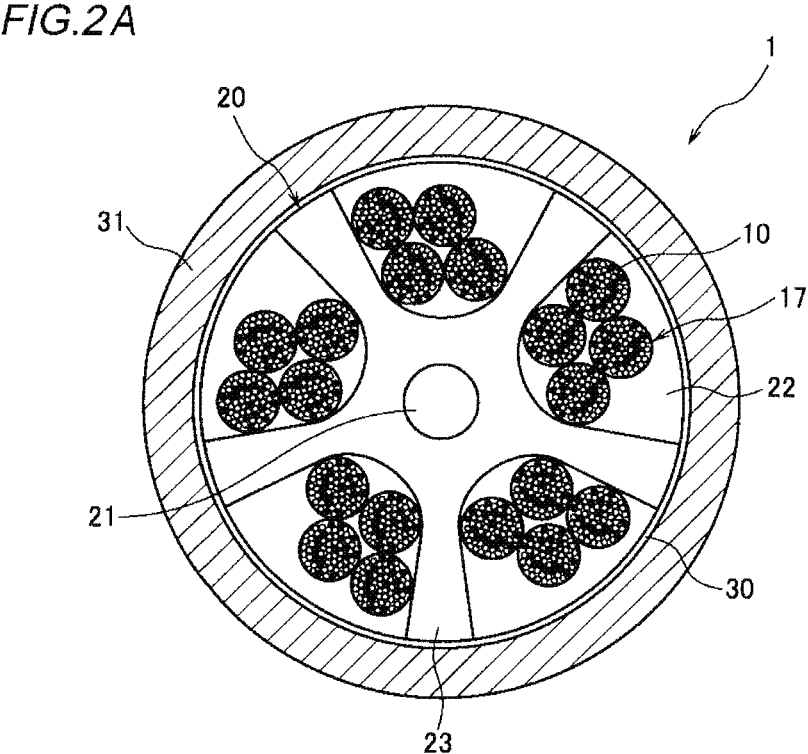
FIG. 2A is a sectional view depicting an example of the optical fiber cable.
Figure 2B:
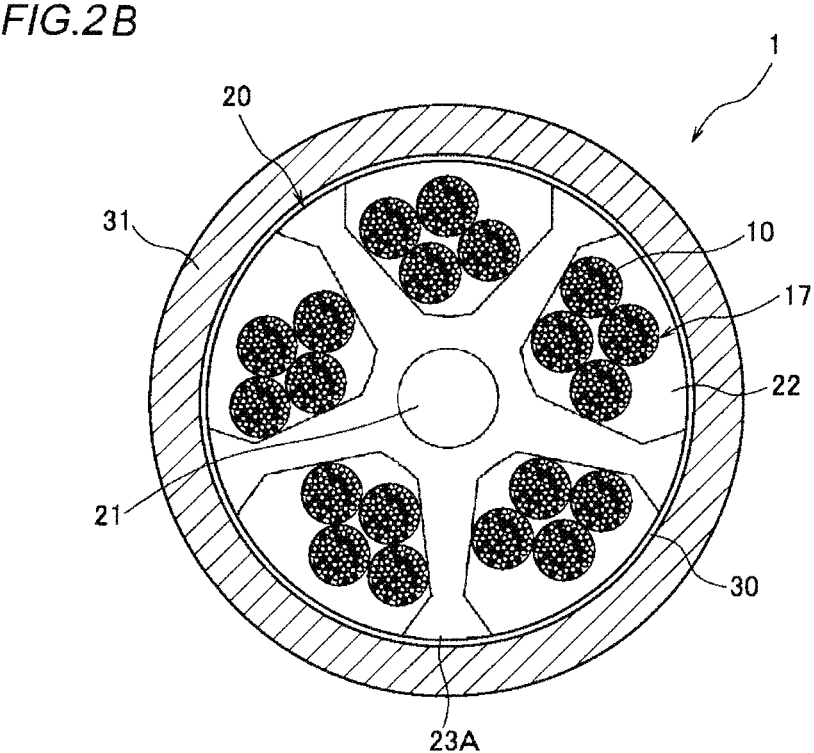
FIG. 2B is a sectional view depicting an example of the optical fiber cable using a modified example of a slot rib.

FIG. 1 depicts an example of an optical fiber cable in accordance with a first embodiment of the present invention. FIG. 2A is a sectional view depicting an example of the optical fiber cable. FIG. 2B is a sectional view depicting an example of the optical fiber cable using a modified example of a slot rib. FIGS. 3A to 3J depict an example and modified examples of a structure of an intermittent ribbon.

An optical fiber cable 1 shown in FIGS. 1 and 2A is an SZ stranded ribbon slot-type cable, and includes optical units 17, a slot rod 20, a wrapping tape 30 longitudinally wrapped or helically wrapped around the slot rod 20, and a cable sheath 31 configured to cover an outer side of the wrapping tape 30. In the meantime, FIG. 1 is a pictorial view in which the optical fiber cable is branched on the way, the cable sheath 31 and the wrapping tape 30 shown in FIG. 2A are partially removed, and the slot rod 20 and the optical unit 17 hanging down from the slot rod 20 are shown. Also, a stranding pitch P3 of slot grooves 22 is configured by a reversed part, an S-stranded part, a reversed part, a Z-stranded part and a reversed part.

As shown in FIG. 2A, the slot rod 20 has a tension member 21 embedded in a central part thereof. For the tension member 21, a rod material having a bearing force against tensile and compression, for example, a steel rod, FRP (Fiber Reinforced Plastics) or the like is used. Also, an outer peripheral surface of the slot rod 20 is formed with a plurality of (for example, five) slot grooves 22 having an SZ shape along a longitudinal direction of the cable. In the meantime, the slot groove 22 corresponds to the groove of the present invention. Also, the slot rod 20 has a slot rib 23 configured to partition the plurality of slot grooves 22 and radially extending from the tension member 21. In the meantime, the slot rib 23 corresponds to the rib of the present invention.

FIG. 2B depicts a modified example of the slot rib of the slot rod 20. As shown in FIG. 2B, a slot rib 23A has a minimum thickness part, which is positioned at an outermore side than a half circumferential portion of a diameter of a slot circumscribed circle of which a center is the tension member 21, and a rib thickness increases from the minimum thickness part toward a rib tip end. Thereby, it is possible to secure a height of the slot groove 22 of the slot rod 20, so that it is possible to increase a cross-sectional area of the slot groove 22.

The optical unit 17 is formed by stacking six intermittent ribbons 10 each of which having 12 fibers to configure 72 fibers, spirally stranding the same in one direction and bundling the same with a bundle material (not shown) for identification. In the meantime, the optical unit may be collected with being stranded into a periodically reversing SZ shape, for example, instead of the structure spirally stranded in one direction.

Figure 3A:
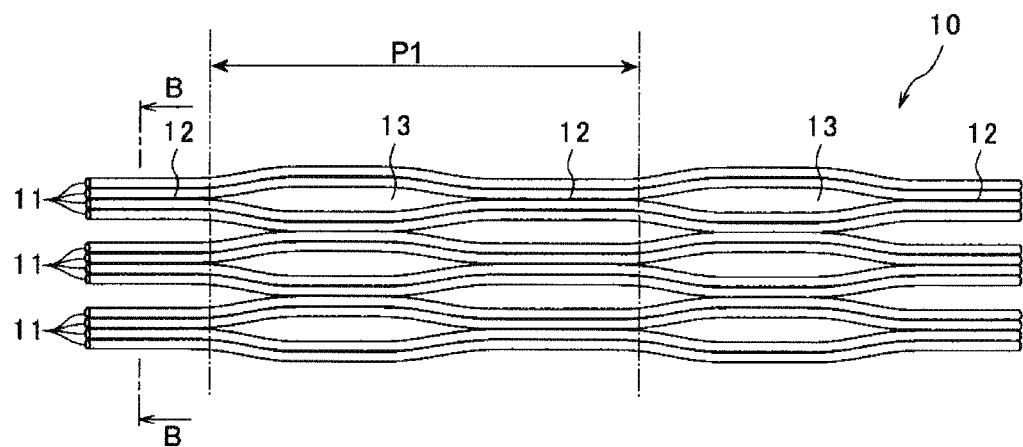
FIG. 3A is a perspective view depicting an example of a structure of an intermittent ribbon.
Figure 3B:
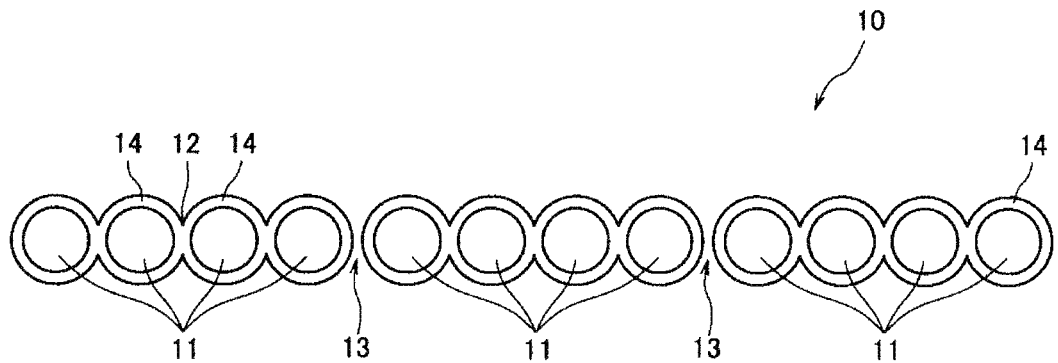
FIG. 3B is a sectional view depicting taken along a B-B line of FIG. 3A, as seen from an arrow direction.

The intermittent ribbon indicates a ribbon in which a plurality of optical fibers is aligned in line in parallel and the optical fibers adjacent to each other are intermittently coupled by coupling portions and non-coupling portions. Specifically, FIG. 3A depicts a state where the intermittent ribbon is opened in the aligning direction, and FIG. 3B is a sectional view taken along a line B-B of FIG. 3A, as seen from an arrow direction. The shown intermittent ribbon 10 is a ribbon of 12 fibers of which fibers are intermittently connected every two fibers.

As shown in FIG. 3B, a ribbon cover 14 of ultraviolet-curable resin or the like is provided around each optical fiber 11, and optical fibers each of which has two integrated fibers, for example, are intermittently coupled by coupling portions 12 and non-coupling portions 13. At the coupling portion 12, the adjacent ribbon covers 14 are coupled, and at the non-coupling portions 13, the adjacent ribbon covers 14 are separate from each other without being coupled.

Figure 3C:
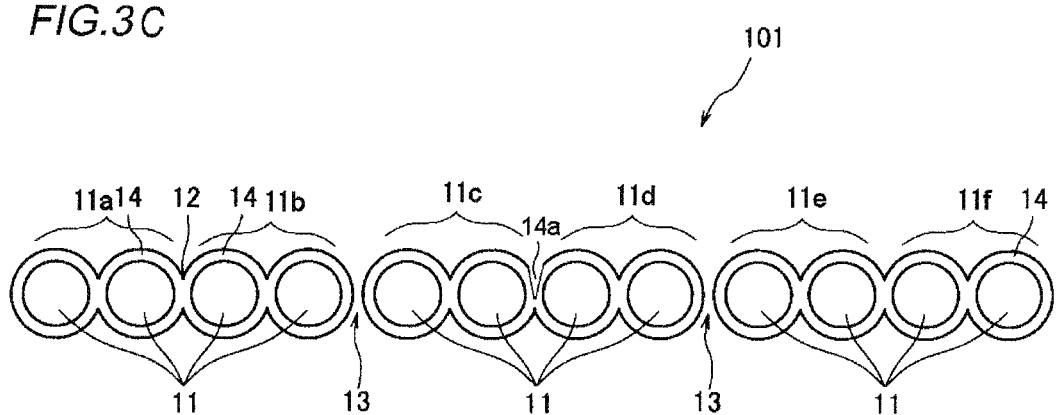
FIG. 3C is a sectional view depicting an intermittent ribbon of a first modified example.
Figure 3D:
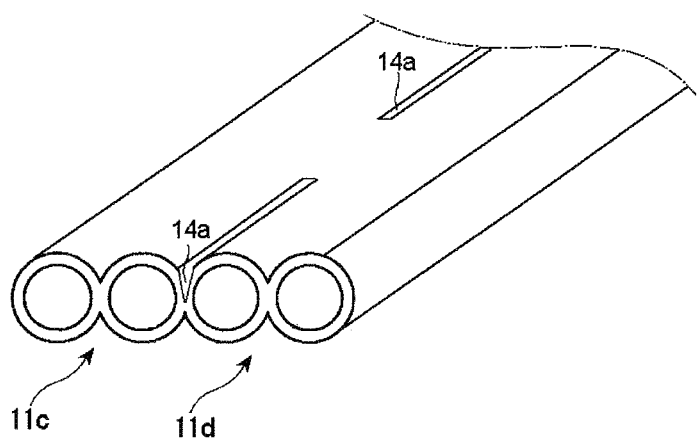
FIG. 3D is a perspective view depicting a sub-unit of a part of the first modified example.

FIGS. 3C and 3D depict an intermittent ribbon 101 of a first modified example. FIG. 3C is a sectional view of the intermittent ribbon 101 in the aligning direction, and FIG. 3D is a perspective view of sub-units 11c, 11d. As shown in FIG. 3D, when configuring one sub-unit 11a, 11b, 11c, 11d, 11e, 11f by two adjacent optical fibers 11, at least one of a recess portion and a step portion positioned between the adjacent sub-units is provided with a slit portion 14a. As shown in FIG. 3D, the slit portions 14a are intermittently provided along a longitudinal direction of the intermittent ribbon 101. Thereby, it is possible to reduce a shock force, which is to be applied to the optical fibers upon separation of a single fiber.

The optical fiber to be accommodated in the intermittent ribbon is an optical fiber formed by further providing a colored cover on an outer side of an optical fiber in which a cover having about a cover outer diameter 250 μm is provided on a glass fiber having a standard outer diameter 125 μm, and the number of optical fibers to be accommodated is arbitrary. In the meantime, the intermittent ribbon may not be configured so that the coupling portions and the non-coupling portions are provided every two fibers. For example, the intermittent ribbon may be intermittently coupled by the coupling portions and the non-coupling portions every one fiber.

Figure 3E:
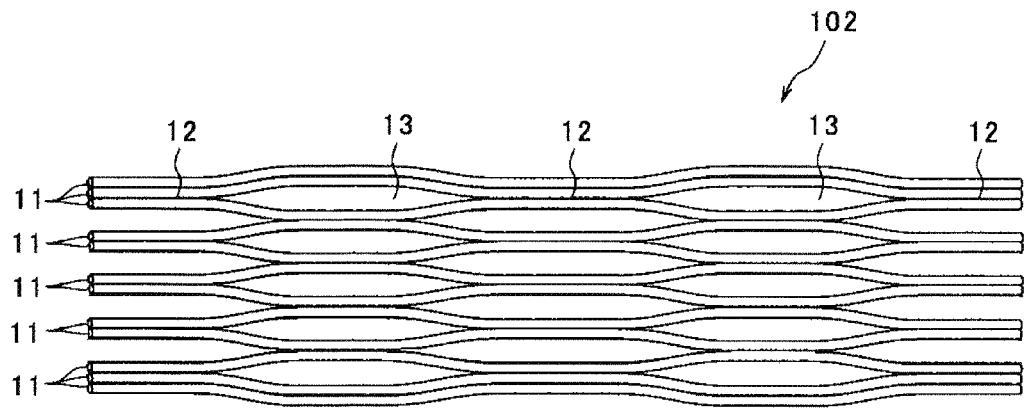
FIG. 3E is a perspective view depicting an intermittent ribbon of a second modified example.

FIG. 3E depicts an intermittent ribbon 102 of a second modified example. As shown in the intermittent ribbon 102 of the second modified example of FIG. 3E, the intermittent ribbon may be configured so that the coupling portions are continuously provided in the longitudinal direction between the adjacent optical fibers of both ends and the other optical fibers are intermittently coupled by the coupling portions and the non-coupling portions every one fiber. Thereby, it is possible to improve the operability when setting the optical fibers to an optical fiber holder upon welding operation without deteriorating the productivity and deformability easiness of the intermittent ribbon.

Figure 3F:
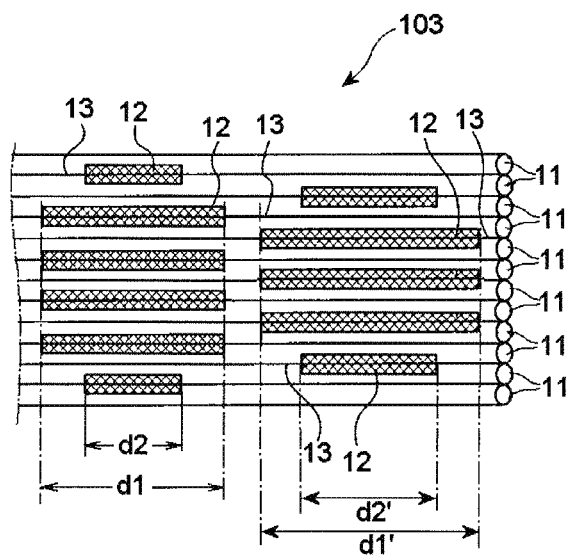
FIG. 3F is a perspective view depicting an intermittent ribbon of a third modified example.

FIG. 3F depicts an intermittent ribbon 103 of a third modified example. Meanwhile, FIG. 3F depicts the intermittent ribbon closed in the aligning direction. As shown in the intermittent ribbon 103 of FIG. 3F, the intermittent ribbon may be configured so that all coupling lengths of the coupling portions 12 are not necessarily required to be the same. For example, coupling lengths d1, d1' of the coupling portions 12 positioned at a more inner side in the aligning direction of the optical fibers 11 may be longer than coupling lengths d2, d2' of the coupling portions 12 positioned at an outermore side. Thereby, the breakage of the coupling portions 12 positioned at the more inner side is suppressed, so that it is possible to maintain a shape of the ribbon and to easily handle the same.

Figure 3G:
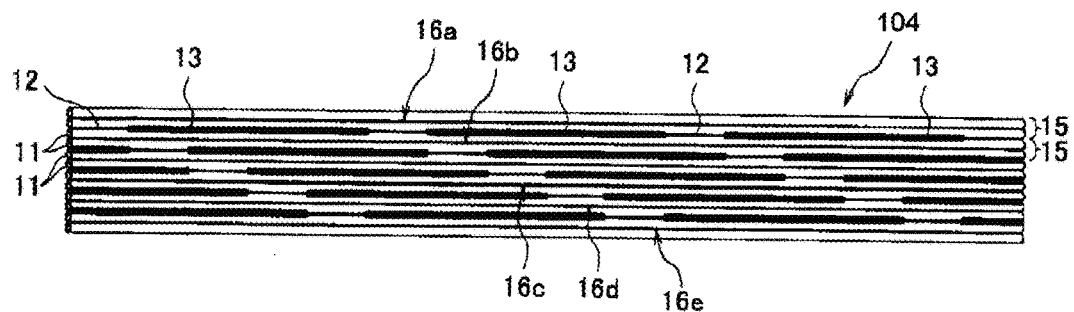
FIG. 3G is a perspective view depicting an intermittent ribbon of a fourth modified example.

FIG. 3G depicts an intermittent ribbon 104 of a fourth modified example. Meanwhile, FIG. 3G depicts the intermittent ribbon closed in the aligning direction. The intermittent ribbon 104 has the optical fibers 11 of 2N (N: an integer of 3 or greater; FIG. 3G depicts an example of 12 optical fibers (N=6)) having an intermittent structure.

The intermittent ribbon 104 has a configuration where the twelve optical fibers 11 are aligned in line in parallel and a sub-ribbon 15 is configured every M adjacent optical fibers (M: an integer of 2 or greater smaller than N; FIG. 3G depicts an example of two fibers (M=2)). In this example, a total of six sets of the sub-ribbons 15 are provided. When the sub-ribbon 15 having two collected fibers is provided, a width is increased, as compared to a single fiber, so that the welding operability is improved.

In the intermittent ribbon 104, the coupling portions and the non-coupling portions are intermittently provided in the longitudinal direction between the adjacent sub-ribbons 15, and when a section of the intermittent ribbon 104 is seen from the aligning direction, the adjacent sub-ribbons are coupled and a ribbon part at which the 2M optical fibers 11 are coupled is one part or less.

In the example of the sub-ribbon 15 having the two collected fibers as shown in FIG. 3G, when a section of the intermittent ribbon is seen from the aligning direction, the intermittent ribbon is configured by a combination of one 4-fiber ribbon part (consisting of two sets of the adjacent sub-ribbons 15) coupled with the coupling portions 12 and four 2-fiber ribbon parts (each of which consists of one set of the sub-ribbon 15) separated with the non-coupling portions 13 aligned in the ribbon aligning direction.

In this way, since the 4-fiber ribbon parts 16a to 16e are respectively provided at positions deviating in the longitudinal direction of the ribbon, it is possible to easily bend the intermittent ribbon in the ribbon aligning direction. As a result, as compared to the related art, it is possible to provide the optical fiber ribbon that can prevent deterioration of transmission characteristics and can be easily handled. Also, when the optical fiber ribbon is configured by the sub-ribbons, a greater width than a single fiber is obtained. Therefore, when setting the intermittent ribbon to a welding holder, for example, the sub-ribbon has difficulty riding on the adjacent coupling portion, being inverted, and separating and protruding from a holder groove, so that it is possible to rapidly perform the welding operation.

Figure 3H:
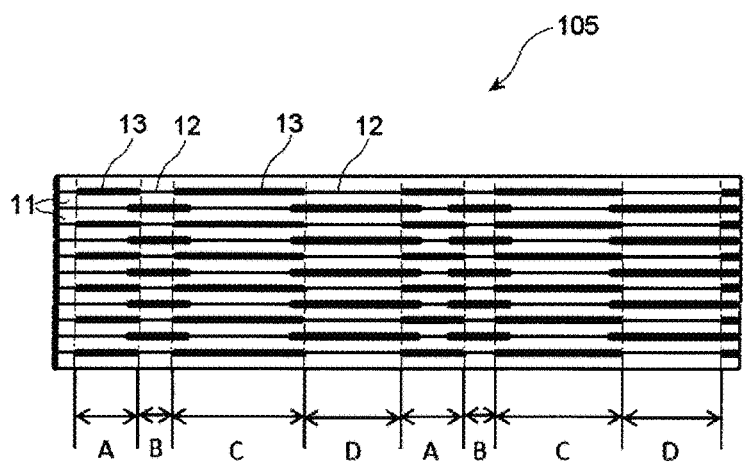
FIG. 3H is a perspective view depicting an example of an intermittent ribbon of a fifth modified example.
Figure 3I:
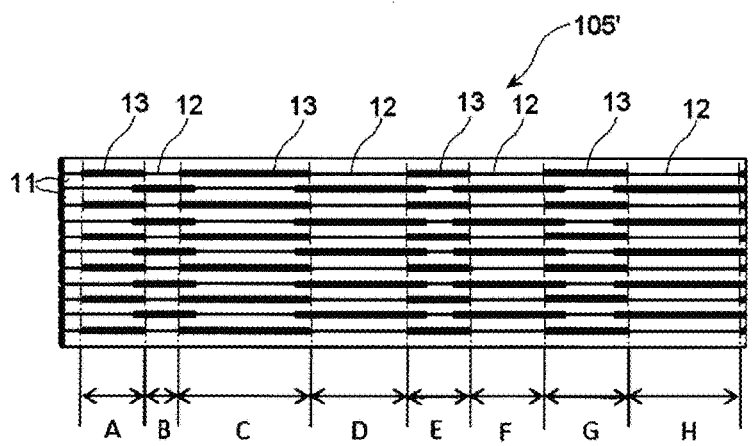
FIG. 3I is a perspective view depicting another example of an intermittent ribbon of the fifth modified example.

FIGS. 3H and 3I depict intermittent ribbons 105, 105' of a fifth modified example. In the meantime, FIGS. 3H and 3I depict the intermittent ribbon closed in the aligning direction. The intermittent ribbons to be accommodated in the same groove 22 of the slot rod 20 preferably have at least two types of intermittent pitches. For example, in the intermittent ribbon 105 shown in FIG. 3H, an intermittent pitch (a length of the non-coupling portion 13+a length of the coupling portion 12) is different between adjacent pitches (A+B and C+D). Also, in the intermittent ribbon 105' shown in FIG. 3I, respective intermittent pitches A+B, C+D, E+F, G+H are different and random. In this way, the non-coupling portions 13 and the coupling portions 12 of the intermittent ribbon are made not to repeat by constant lengths. Therefore, even when the intermittent ribbon is mounted to a cable with a constant stranding pitch, the same structure portions of the intermittent ribbon are not mounted at places of the cable at which the stranding pitch is same, and the stress to be applied to the intermittent ribbon is also alleviated in the longitudinal direction, so that it is possible to prevent the large transmission loss. Also, since the longitudinal random nature as the ribbon increases, the above configuration favorably acts, from a standpoint of PMD characteristics, too.

Figure 3J:
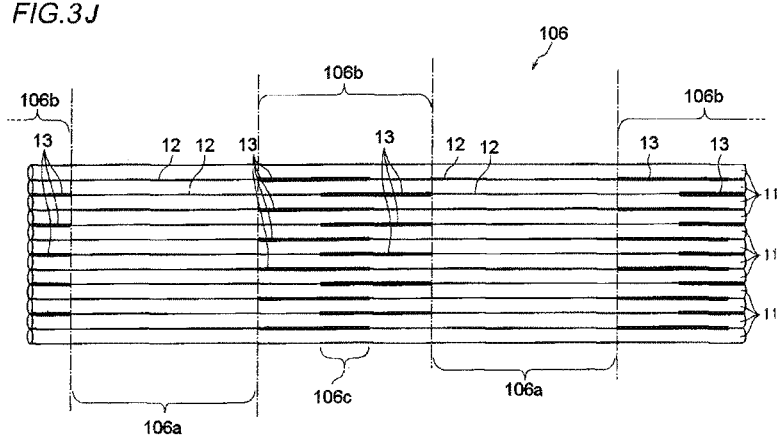
FIG. 3J is a perspective view depicting an intermittent ribbon of a sixth modified example.

FIG. 3J depicts an intermittent ribbon 106 of a sixth modified example. Meanwhile, FIG. 3J depicts the intermittent ribbon closed in the aligning direction. In the intermittent ribbon 106, integrated ribbon parts 106a in which a plurality of (twelve) optical fibers is all coupled by the coupling portions 12 and slitted ribbon parts 106b in which the non-coupling portions 13 adjacent to each other in the aligning direction of the intermittent ribbon 106 are alternately arranged in the longitudinal direction of the intermittent ribbon 106 are periodically provided in the longitudinal direction of the intermittent ribbon 106. The slitted ribbon part 106b is not provided with the coupling portions 12, and is provided with single fiber ribbon parts 106c by the plurality of (twelve) optical fibers 11 separated by the non-coupling portions 13, as seen from the aligning direction of the intermittent ribbon 106. In this way, when the single fiber ribbon parts 106c are provided, it is possible to improve the single fiber separability.

Four bundles of the optical units 17 (72 fibers) spirally stranded in advance in one direction are accommodated in each slot groove 22 shown in FIGS. 2A and 2B, for example, and the optical fiber cable 1 having the five slot grooves 22 configures a cable of 1440 fibers. In the meantime, a process of stranding and collecting the optical units and a process of accommodating the same in slots can be implemented in the same process.

The slot rod 20 is wrapped and is collected into a round shape with the wrapping tape 30 so that the optical units 17 do not protrude, for example.

For the wrapping tape 30, a non-woven fabric formed to have a tape shape, a tape formed by bonding a base material such as polyethylene terephthalate (PET) and a non-woven fabric each other, or the like is used. In the meantime, a water absorbing agent (for example, absorbing powders) may also be added to the wrapping tape. When the wrapping tape is made to function as a water absorbing layer, it is possible to provide the intermittent ribbon or the like with a waterproof property.

An outer side of the wrapping tape 30 is covered with the cable sheath 31 made of PE (polyethylene), PVC (polyvinyl chloride) or the like, for example, and is formed to have a round shape.

Figure 4:
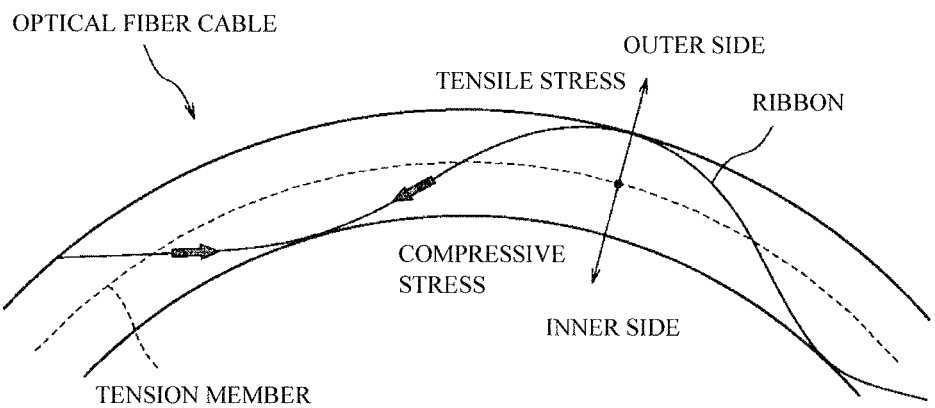
FIG. 4 illustrates a state where the optical fiber cable is bent into a circular arc shape.

FIG. 4 illustrates a state where the optical fiber cable is bent into a circular arc shape.

When the optical fiber cable is bent into a circular arc shape, the tension member becomes a center of bending, the tensile stress is generated at an outer side of the tension member, and the compressive stress shown with an arrow in FIG. 4 is generated at an inner side, so that the compressive strain is applied to the ribbon positioned at the inner side. When the ribbon can be moved in the longitudinal direction of the cable so as to cancel the compressive strain, the transmission loss is slight.

However, when the ribbons are mounted at high density in the slot grooves, the ribbons are difficult to move in the longitudinal direction of the cable, and portions incapable of enduring the compressive strain protrude outside the slot grooves, so that the macrobend loss may be caused at the portions.

Therefore, in the embodiment, as shown in FIGS. 2A and 2B, the optical units 17 spirally stranded in advance in one direction are accommodated in the slot grooves 22. Thereby, even when the ribbons are mounted at high density in the slot grooves, the macrobend loss is suppressed.

More specifically, an occupancy (i.e., a total cross-sectional area of ribbons/a cross-sectional area of slot groove) calculated from a cross-sectional area of the optical units 17 relative to a cross-sectional area of the slot groove 22 shown in FIGS. 2A and 2B is set to 25% to 65%. In the meantime, the total cross-sectional area of ribbons includes cross-sectional areas of the ribbon covers 14 and the ribbons 10 shown in FIGS. 3A and 3B. Also, as the number of the optical units 17 increases, the cross-sectional area also increases.

A stranding pitch P2 of the optical unit 17 was set to 500 mm, a stranding pitch P3 of the slot groove 22 was set to 700 mm, the occupancy was set to 50%, the optical fiber cable 1 was bent into a circular arc shape of ϕ500 mm, and the transmission loss was measured.

When the optical fiber cable of the related art (the not-stranded ribbons were accommodated in the slot grooves) was bent into a circular arc shape, the transmission loss (wavelength 1550 nm) was 1 dB/km or greater. However, when the optical fiber cable 1 of the embodiment (the stranded optical units 17 were accommodated in the slot grooves 22) was bent into a circular arc shape, the transmission loss was 0.1 dB/km or less.

Also, in the tests that were performed while changing the occupancy, when the occupancy of the stranded optical units exceeded 65%, it was not possible to suppress the transmission loss. The reason is thought that the portions incapable of enduring the compressive strain protruded outward and the macrobend loss increased. Therefore, it can be seen that when the occupancy is set to 65% or less, it is possible to improve the bendability of the cable even though the ribbons are mounted at high density in the slot grooves.

On the other hand, when the occupancy of the stranded optical units is less than 25%, it is not possible to increase the density of the ribbons.

Also, when the optical units are stranded and collected, it is possible to implement the above occupancy even though the general ribbons are used. However, when the intermittent ribbons are used, the flexibility is improved, so that it is possible to more easily increase the density of the ribbons.

Furthermore, when the stranding pitch P2 of the optical units is made shorter than the stranding pitch P3 of the slot grooves, the compressive strain can be more easily dispersed, as compared to a configuration the stranding pitch P2 is made equal to or longer than the stranding pitch P3 of the slot grooves, so that it is possible to more easily improve the bendability of the cable.

Figure 5:
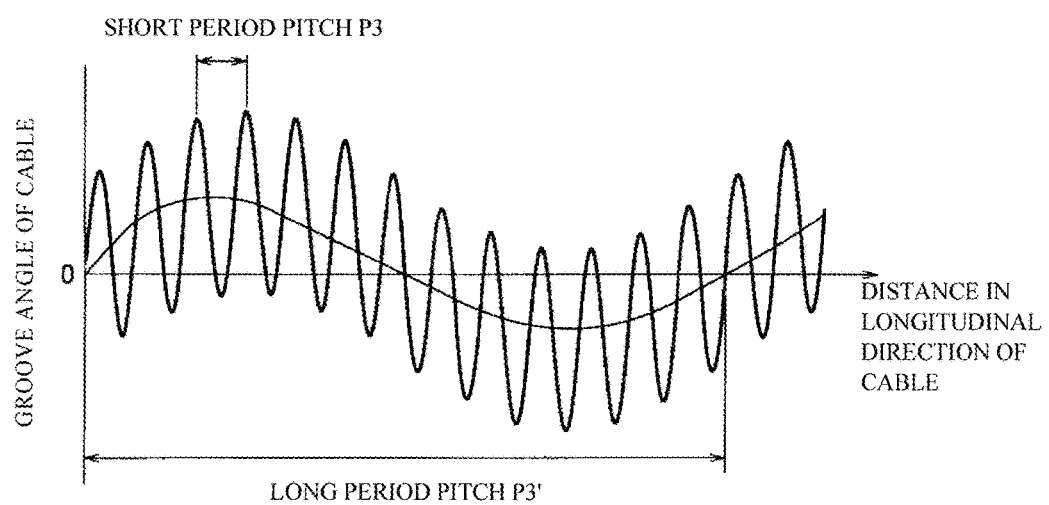
FIG. 5 is a view for illustrating a slot rod of another embodiment.

FIG. 5 is a view for illustrating a slot rod in accordance with another embodiment.

In the above embodiment, the slot grooves are configured with one type of stranding pitch. However, the slot grooves may also be configured by a combination of an SZ locus consisting of a sinusoidal curve of a short period and an SZ locus consisting of a sinusoidal curve of a period longer than the short period (a complex SZ type; also referred to as an SZ on SZ).

Specifically, in FIG. 5, a short period pitch P3 is set to 700 mm, and a long period P3' is set to about 9100 mm. The cable is wound to a body part of a winding drum (not shown) with relatively high tension so as to prevent wrapping breakage and the like, and the tension to be applied to the upper layer cable becomes a side pressure of the lower layer cable. Therefore, when the slot grooves are configured by a complex SZ type, a period thereof becomes random (is not constant), so that it is possible to randomize the side pressure to be applied to the intermittent ribbon upon the winding to the drum, which also contributes to improvements on the side pressure characteristic.

Examples

The optical units 17 having the primarily stranded ribbons 10 were mounted to the optical fiber cable 1 of the embodiment. Upon the mounting, the intermittent ribbon pitch P1 of the ribbon 10, the primary stranding pitch P2 of the optical unit 17, the slot stranding pitch P3 of the slot groove 22 were respectively changed, and in each case, the transmission loss of the optical fiber cable 1 was evaluated and it was also evaluated whether the intermittent ribbon was separated upon the primary stranding. The results are shown in Table 1. In the meantime, as the intermittent ribbon, the ribbon shown in FIG. 3A was used.

TABLE 1

| No. | intermittent ribbon pitch P1 | primary stranding pitch P2 | slot stranding pitch P3 | P2/P1 | composite stranding pitch (1/Pmix = 1/(P2 + P3)) | transmission loss (dB/km) | whether intermittent ribbon was separated |
|---|---|---|---|---|---|---|---|
| 1 | 50 | 250 | 600 | 5.0 | 176 | ○ (0.19) | ○ |
| 2 | 100 | 250 | 600 | 2.5 | 176 | ○ (0.19) | ○ |
| 3 | 150 | 250 | 600 | 1.7 | 176 | ○ (0.19) | ○ |
| 4 | 200 | 250 | 600 | 1.3 | 176 | ○ (0.19) | x (separated) |
| 5 | 50 | 500 | 600 | 10.0 | 273 | x (0.35) | ○ |
| 6 | 100 | 500 | 600 | 5.0 | 273 | ○ (0.19) | ○ |
| 7 | 150 | 500 | 600 | 3.3 | 273 | ○ (0.19) | ○ |
| 8 | 200 | 500 | 600 | 2.5 | 273 | ○ (0.19) | ○ |
| 9 | 50 | 750 | 600 | 15.0 | 333 | x (0.40) | ○ |
| 10 | 100 | 750 | 600 | 7.5 | 333 | ○ (0.24) | ○ |
| 11 | 150 | 750 | 600 | 5.0 | 333 | ○ (0.23) | ○ |
| 12 | 200 | 750 | 600 | 3.8 | 333 | ○ (0.21) | ○ |
| 13 | 50 | 1000 | 600 | 20.0 | 375 | x (0.80) | ○ |
| 14 | 100 | 1000 | 600 | 10.0 | 375 | x (0.65) | ○ |
| 15 | 150 | 1000 | 600 | 6.7 | 375 | ○ (0.25) | ○ |
| 16 | 200 | 1000 | 600 | 5.0 | 375 | ○ (0.24) | ○ |
| 17 | 50 | 250 | 850 | 5.0 | 193 | ○ (0.21) | ○ |
| 18 | 100 | 250 | 850 | 2.5 | 193 | ○ (0.2) | ○ |
| 19 | 150 | 250 | 850 | 1.7 | 193 | ○ (0.2) | ○ |
| 20 | 200 | 250 | 850 | 1.3 | 193 | ○ (0.2) | x (separated) |
| 21 | 50 | 500 | 850 | 10.0 | 315 | x (0.4) | ○ |

TABLE 1-continued

| No. | intermittent ribbon pitch P1 | primary stranding pitch P2 | slot stranding pitch P3 | P2/P1 | composite stranding pitch (1/Pmix = 1/(P2 + P3)) | transmission loss (dB/km) | whether intermittent ribbon was separated |
|---|---|---|---|---|---|---|---|
| 22 | 100 | 500 | 850 | 5.0 | 315 | o (0.23) | o |
| 23 | 150 | 500 | 850 | 3.3 | 315 | o (0.22) | o |
| 24 | 200 | 500 | 850 | 2.5 | 315 | o (0.21) | o |
| 25 | 50 | 750 | 850 | 15.0 | 398 | x (0.73) | o |
| 26 | 100 | 750 | 850 | 7.5 | 398 | o (0.28) | o |
| 27 | 150 | 750 | 850 | 5.0 | 398 | o (0.27) | o |
| 28 | 200 | 750 | 850 | 3.8 | 398 | o (0.25) | o |
| 29 | 50 | 1000 | 850 | 20.0 | 459 | x (1.4) | o |
| 30 | 100 | 1000 | 850 | 10.0 | 459 | x (1.22) | o |
| 31 | 150 | 1000 | 850 | 6.7 | 459 | x (0.33) | o |
| 32 | 200 | 1000 | 850 | 5.0 | 459 | x (0.31) | o |

In the results of Table 1, the conditions with which the transmission loss is favorably 0.28 db/km or less and the separation of the intermittent ribbon is not caused upon the primary stranding are preferable.

In the preferable conditions, a relation of the intermittent ribbon pitch P1, the primary stranding pitch P2 and the slot stranding pitch P3 was $$2.5 \leq P2/P1 \leq 7.5 \quad \text{(equation 1)}.$$

Also, in the preferable conditions, the composite stranding pitch Pmix indicated by 1/Pmix=1/P2+1/P3 was $$Pmix \leq 398 \quad \text{(equation 2)}.$$

The embodiments are exemplary and non-restrictive in every respect. The scope of the present invention is defined by the claims, rather than the above description, and is intended to include all changes within the scope and meaning equivalent to the claims.

The subject application is based on Japanese Patent Application No. 2015-151941 filed on Jul. 31, 2015, the contents of which are incorporated by reference. Additionally, all the references cited herein are incorporated.

DESCRIPTION OF REFERENCE NUMERALS

1 . . . optical fiber cable, 10 . . . intermittent ribbon, 11 . . . optical fiber, 12 . . . coupling portion, 13 . . . non-coupling portion, 14 . . . ribbon cover, 17 . . . optical unit, 20 . . . slot rod, 21 . . . tension member, 22 . . . slot groove, 23 . . . slot rib, 30 . . . wrapping tape, 31 . . . cable sheath

The invention claimed is:

1. An optical fiber cable comprising:
optical units in each of which ribbons each having a plurality of optical fibers arranged in parallel are collected;
a slot rod having a plurality of grooves each configured to accommodate therein the optical units;
a tension member to which tension is to be applied; and
a cable sheath configured to cover an outer side of the slot rod,
wherein in each of the grooves, the optical units are accommodated in a state where each of the optical units is stranded, and an occupancy of the optical units calculated from a cross-sectional area of the optical units relative to a cross-sectional area of the groove is 25% to 65%,
wherein each ribbon is intermittently provided with coupling portions, at which the adjacent optical fibers are coupled therebetween, and non-coupling portions, at which the adjacent optical fibers are not coupled therebetween, in a longitudinal direction between some or all of the optical fibers in a state where the plurality of optical fibers is arranged in parallel, and
wherein when an intermittent pitch of each ribbon in the longitudinal direction is denoted as P1, a stranding pitch of each optical unit is denoted as P2, and a stranding pitch of the slot rod is denoted as P3, a relation of $2.5 \leq P2/P1 \leq 7.5$ is satisfied, and a composite stranding pitch Pmix expressed by 1/Pmix=1/P2+1/P3 is 398 or smaller.

2. The optical fiber cable according to claim 1, wherein when two adjacent optical fibers of each ribbon are configured as one sub-unit, at least one of a recess portion and a step portion positioned between adjacent sub-units is intermittently provided with a slit portion in a longitudinal direction.

3. The optical fiber cable according to claim 1, wherein each ribbon is continuously provided with the coupling portions in the longitudinal direction between the adjacent optical fibers of both ends thereof.

4. The optical fiber cable according to claim 1, wherein a coupling length of the coupling portion positioned at a more inner side in an aligning direction of each ribbon is longer than a coupling length of the coupling portion positioned at an outermore side.

5. The optical fiber cable according to claim 1, wherein each ribbon is an optical fiber ribbon having 2N (N: an integer of 3 or greater) optical fibers, a sub-unit is integrated every M (M: an even number smaller than N) optical fibers, coupling portions and non-coupling portions are intermittently provided in a longitudinal direction between adjacent sub-units, the adjacent sub-units are coupled and a part at which the 2M optical fibers are coupled is one part or less.

6. The optical fiber cable according to claim 1, wherein the ribbons to be accommodated in the same groove of the slot rod have at least two types of intermittent pitches.

7. The optical fiber cable according to claim 1, wherein integrated ribbon parts in which the plurality of optical fibers is all coupled by the coupling portions and slitted ribbon parts in which the non-coupling portions adjacent to each other in an aligning direction of each ribbon are alternately arranged in a longitudinal direction of each ribbon are periodically provided in the longitudinal direction of each ribbon, and the slitted ribbon parts are configured to form single fiber ribbon parts, which are to be obtained by separating all the plurality of optical fibers with the non-coupling portions.

8. The optical fiber cable according to claim 1, wherein a minimum thickness part of a rib configured to partition the respective grooves of the slot rod is positioned at an outermore side than a half circumferential portion of a diameter of a slot rod circumscribed circle of which a center is the tension member, and a rib thickness increases from the minimum thickness part toward a rib tip end.

9. The optical fiber cable according to claim 1, wherein a stranding pitch of each optical unit is shorter than a stranding pitch of each respective groove.

10. The optical fiber cable according to claim 1, wherein each groove is configured by a combination of an SZ locus of a short period and an SZ locus of a period longer than the short period.

* * * * *